United States Patent [19]
Lee et al.

[11] Patent Number: 6,083,640
[45] Date of Patent: Jul. 4, 2000

[54] SECONDARY BATTERY WITH ELECTRODE ASSEMBLY FIXING DEVICE

[75] Inventors: Jin-Uk Lee; Jun-Won Kang; Chang-Seob Kim, all of Chungchongnam-do, Rep. of Korea

[73] Assignee: Samsung Display Device Co., Ltd., Rep. of Korea

[21] Appl. No.: 09/315,450

[22] Filed: May 20, 1999

[30] Foreign Application Priority Data

Sep. 22, 1998 [KR] Rep. of Korea ...................... 98-39176
Nov. 20, 1998 [KR] Rep. of Korea ...................... 98-49997

[51] Int. Cl.[7] ...................................................... H01M 2/26
[52] U.S. Cl. ........................... 429/94; 429/161; 429/186; 429/208
[58] Field of Search .............................. 429/94, 161, 186, 429/208, 163

[56] References Cited

U.S. PATENT DOCUMENTS

| | | |
|---|---|---|
| 4,563,370 | 1/1986 | Menard .................................. 427/123 |
| 4,663,247 | 5/1987 | Smilanich et al. ........................ 429/94 |
| 4,937,154 | 6/1990 | Moses et al. .............................. 429/94 |
| 5,486,215 | 1/1996 | Kelm et al. ............................. 29/623.1 |
| 5,916,707 | 6/1999 | Omaru et al. ............................ 429/163 |

*Primary Examiner*—Maria Nuzzolillo
*Assistant Examiner*—Raymond Alejandro
*Attorney, Agent, or Firm*—Baker & McKenzie

[57] ABSTRACT

A secondary battery includes a case, a rolled electrode assembly disposed within the case, and an electrode assembly fixing member receiving a portion of the rolled electrode assembly so that expansion and contraction of the rolled electrode assembly can be suppressed during charging and discharging operations of the battery, and deformation of the rolled electrode assembly caused by outer impact can be prevented. The electrode assembly fixing member comprises a cap fitted onto at least one of upper and lower ends of the rolled electrode assembly. The electrode assembly fixing member further comprises a gripper holding the rolled electrode assembly.

10 Claims, 5 Drawing Sheets

PRIOR ART

SECONDARY BATTERY WITH ELECTRODE ASSEMBLY FIXING DEVICE

BACKGROUND OF THE INVENTION

1. Field of the Invention

The present invention relates to a secondary battery and, more particularly, to a secondary battery with an electrode assembly fixing device that can prevent deformation and variation in volume of the electrode assembly during charging and discharging operations.

2. Description of the Prior Art

Generally, secondary batteries are compact in size and rechargeable, while providing a large capacity. Well known as secondary batteries are a lithium-ion battery and a lithium-ion polymer battery.

The lithium-ion battery uses lithium metal oxide as a positive active material and carbon or a carbon compound as a negative active material. Lithium salt dissolved in an organic solvent is used as an electrolyte via which lithium ions move between positive and negative electrodes.

In addition, the lithium-ion polymer battery uses a hybrid polymer as separators disposed between the positive and negative electrodes. The electrolyte is impregnated into the separators made of the hybrid polymer so that charging and discharging operations are realized while the lithium ions are moved between the positive and negative electrodes via the separators.

FIG. 5 shows a conventional prism-type lithium-ion battery.

A rolled electrode assembly 2 is inserted into a can 4 filled with electrolyte, the rolled electrode assembly 2 comprising positive and negative electrodes and separators disposed between the positive and negative electrodes. Mounted on an upper end of the can 4 is a cap assembly 6.

In the conventional lithium-ion battery structured as in the above, the can 4 has to be designed having sufficient strength to withstand pressure generated when the rolled electrode assembly 2 repeatedly expands and contracts as the battery is charged and discharged. For example, when the can 4 is made of iron or aluminum, the can 4 is designed to have a thickness of about 0.4–0.6 mm, making it difficult to reduce the weight of the battery. That is, the weight of the iron can is about 17 g, and the weight of the aluminum can is about 8–9 g.

In addition, the expansion and contraction of the rolled electrode assembly 2 causes active material to be removed therefrom, deteriorating reliability of the battery. Furthermore, it is easy for the rolled electrode assembly 2 to be deformed when it receives external impact, thereby degrading the battery.

SUMMARY OF THE INVENTION

The present invention has been made in an effort to solve the above described problems.

It is an objective of the present invention to provide a secondary battery that can prevent removal of active material from an electrode assembly as well as deformation of the electrode assembly.

To achieve the above objective, the present invention provides a battery comprising a case, an rolled electrode assembly disposed within the case, and an electrode assembly fixing member receiving a portion of the electrode assembly so that expansion and contraction of the electrode assembly can be suppressed during charging and discharging operations of the battery, and deformation of the electrode assembly caused by outer impact can be prevented.

According to an embodiment of the present invention, the electrode assembly fixing member comprises a cap fitted onto at least one of upper and lower ends of the electrode assembly.

According to another embodiment of the present invention, the electrode assembly fixing member comprises a gripper holding the rolled electrode assembly.

Preferably, the electrode assembly fixing member further comprises flat plates disposed on surfaces of the rolled electrode assembly, the gripper facing the flat plates toward the surfaces of the rolled electrode assembly so as to uniformly apply pressure over the surface of the entire rolled electrode assembly.

In addition, the electrode assembly fixing member is made of a material selected from the group consisting of polypropylene, polyethylene, polyvinylidene fluoride, stainless, teflon, Fe coated with nickel, nickel and aluminum which do not react with electrolyte and are not corroded by the lithium salt.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF PREFERRED EMBODIMENT

Reference will now be made in detail to the present preferred embodiment of the invention with reference to the accompanying drawings. Wherever possible, the same reference numbers will be used throughout the drawings to refer the same or like parts.

Figure 1:
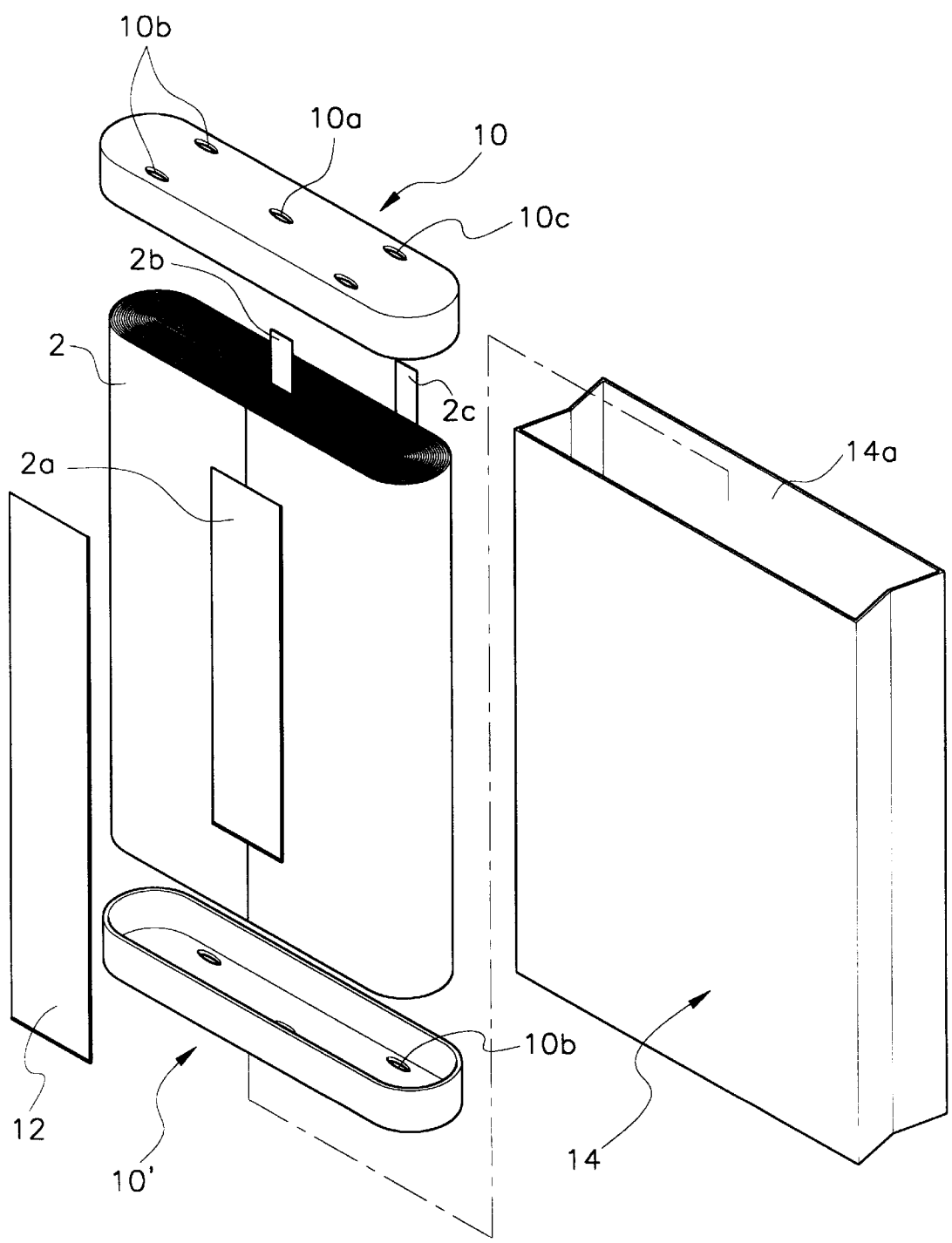
FIG. 1 is an exploded perspective view of a secondary battery according to a first preferred embodiment of the present invention.
Figure 2:
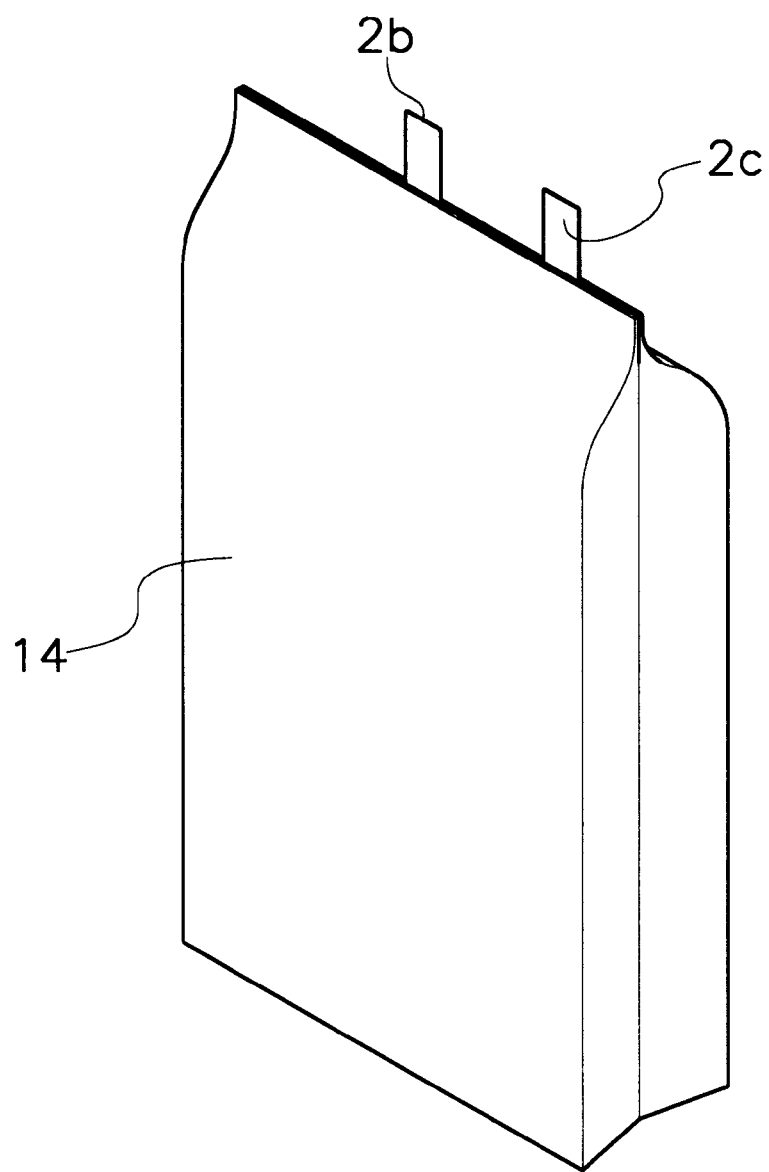
FIG. 2 is a perspective view illustrating an outer configuration of a secondary battery according to a first preferred embodiment of the present invention.

FIGS. 1 and 2 show a secondary battery according to a first preferred embodiment of the present invention.

A rolled electrode assembly 2 comprises positive and negative electrodes, and separators disposed between the positive and negative electrodes. The outermost turn of the rolled electrode assembly 2 is fixed by a tape 2a.

When the secondary battery is a lithium-ion battery or a lithium-ion polymer battery, lithium metal oxide containing at least one material selected from the group consisting of $LiCoO_2$, $LiNiO_2$ and $LiMn_2O_4$ is used as a positive active material, and carbon or a carbon compound is used as a negative active material.

As a feature of the present invention, an electrode assembly fixing member is provided to prevent the rolled electrode assembly from being deformed by expansion and contraction of the rolled electrode assembly or when the electrode assembly receives outer impact.

Describing more in detail, the electrode assembly fixing member comprises an upper cap 10 close-tightly fitted onto an upper end of the rolled electrode assembly 2 and a lower cap 10' close-tightly fitted onto a lower end of the rolled electrode assembly 2.

However, the electrode assembly fixing member is not limited to this structure. For example, only one of the upper and lower ends of the rolled electrode assembly 2 can be fitted into a cap. In addition, in this embodiment, to provide a more reliable fixing structure, the upper and lower caps 10 and 10' are fixed to the rolled electrode assembly 2 by a tape 12.

The upper and lower caps 10 and 10' are made of a material selected from the group consisting of polypropylene, polyethylene, polyvinylidene fluoride, stainless steel, teflon, Fe coated with nickel, nickel and aluminum which do not react with electrolyte and are not corroded by the lithium salt.

The upper cap 10 is provided with holes 10a and 10c through which positive and negative tabs 2b and 2c extended from the rolled electrode assembly 2 pass, respectively. In addition, the upper and lower caps 10 and 10' are provided with a plurality of holes 10b through which electrolyte is impregnated into the electrode assembly 2, thereby reducing an impregnation time when injecting the electrolyte.

The rolled electrode assembly 2 tightly fitted into the caps 10 and 10' is inserted into a light-weight case 14 such that the positive and negative tabs 2b and 2c are led out of an opening 14a of the case 14. In this state, the opening 14a is sealed, thereby obtaining a secondary battery as shown in FIG. 2.

In this embodiment, as the light-weight case 14, a pouch made of thermoplastic resin or a sheet made by laminating an aluminum film and thermoplastic resin film may be used.

Figure 3:
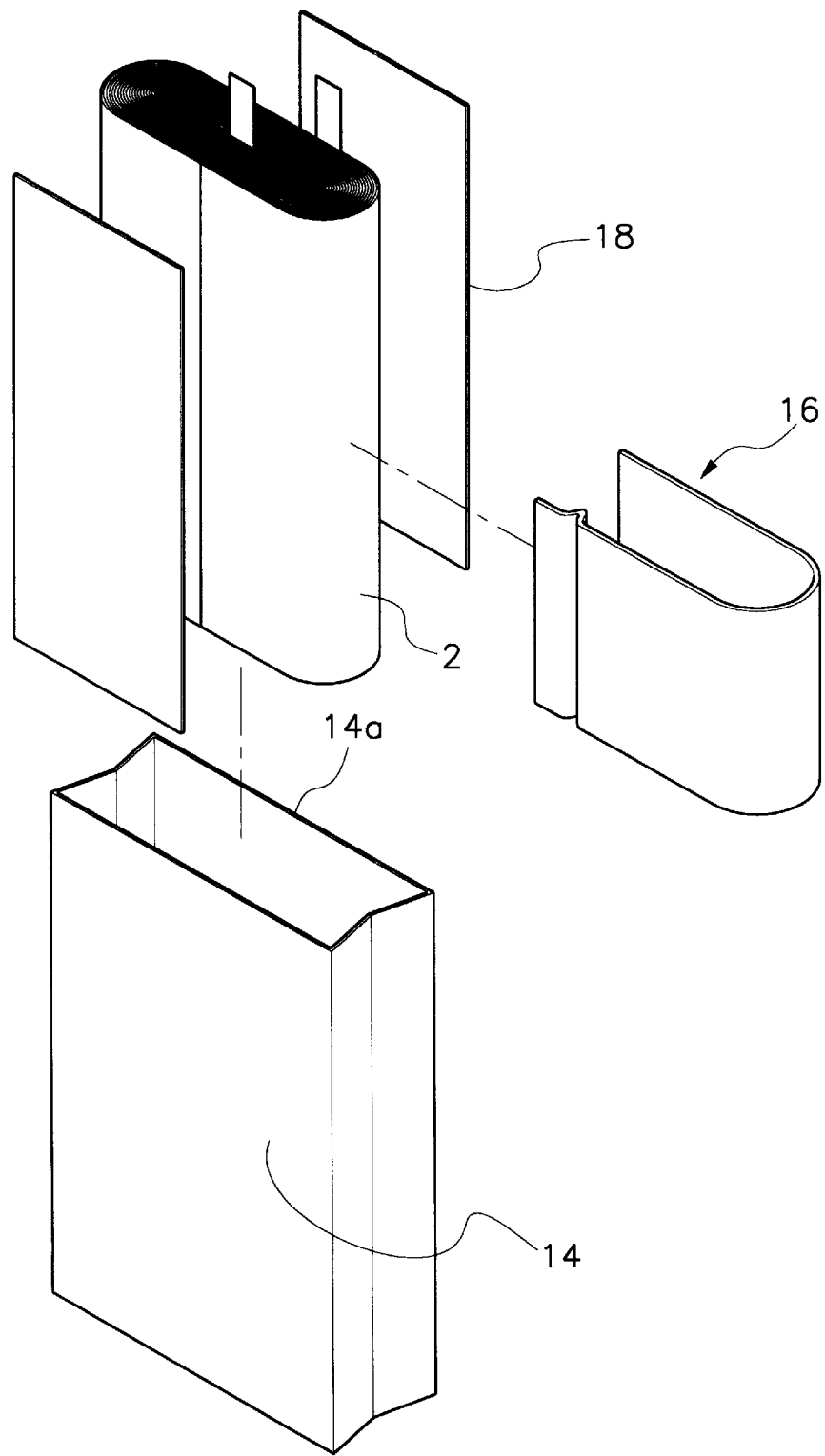
FIG. 3 is an exploded perspective view of a secondary battery according to a second preferred embodiment of the present invention.

FIG. 3 shows an electrode assembly fixing member according to a modified example of the first embodiment.

In this example, the electrode assembly fixing member comprises a gripper 16 which is fitted onto an outer side of the rolled electrode assembly 2 such that it can fixedly compress front and rear sides of the rolled electrode assembly 2. Two or more grippers 16 may be fitted onto left, right or lower side of the electrode assembly 2.

In addition, if the caps 10 described in the first preferred embodiment is used together with the gripper 16, deformation of the rolled electrode assembly 2 can be further prevented.

Meanwhile, to equally apply pressure throughout the front and rear surfaces of the rolled electrode assembly 2 using the gripper 16, flat plates 18 are disposed on the front and rear surfaces of the rolled electrode assembly 2, then the gripper 16 is fitted onto the flat plates 18 so that the flat plates 18 uniformly contact the front and rear surfaces of the electrode assembly 2 in a face-to-face manner.

The gripper 16 and the flat plates 18 are also are made of a material selected from the group consisting of polypropylene, polyethylene, polyvinylidene fluoride, stainless steel, teflon, Fe coated with nickel, nickel and aluminum which do not react with the electrolyte and are not corroded by the lithium salt.

Accordingly, the combination of the plates 18 and the gripper 16 effectively suppresses the deformation and release of the rolled electrode assembly 2.

The rolled electrode assembly 2 is inserted into the light-weight case 14 together with electrolyte, then the case 14 is sealed in a state where positive and negative tabs 2b and 2c extend out of the opening 14a of the case 14, thereby obtaining a secondary battery as shown in FIG. 2.

Figure 4:
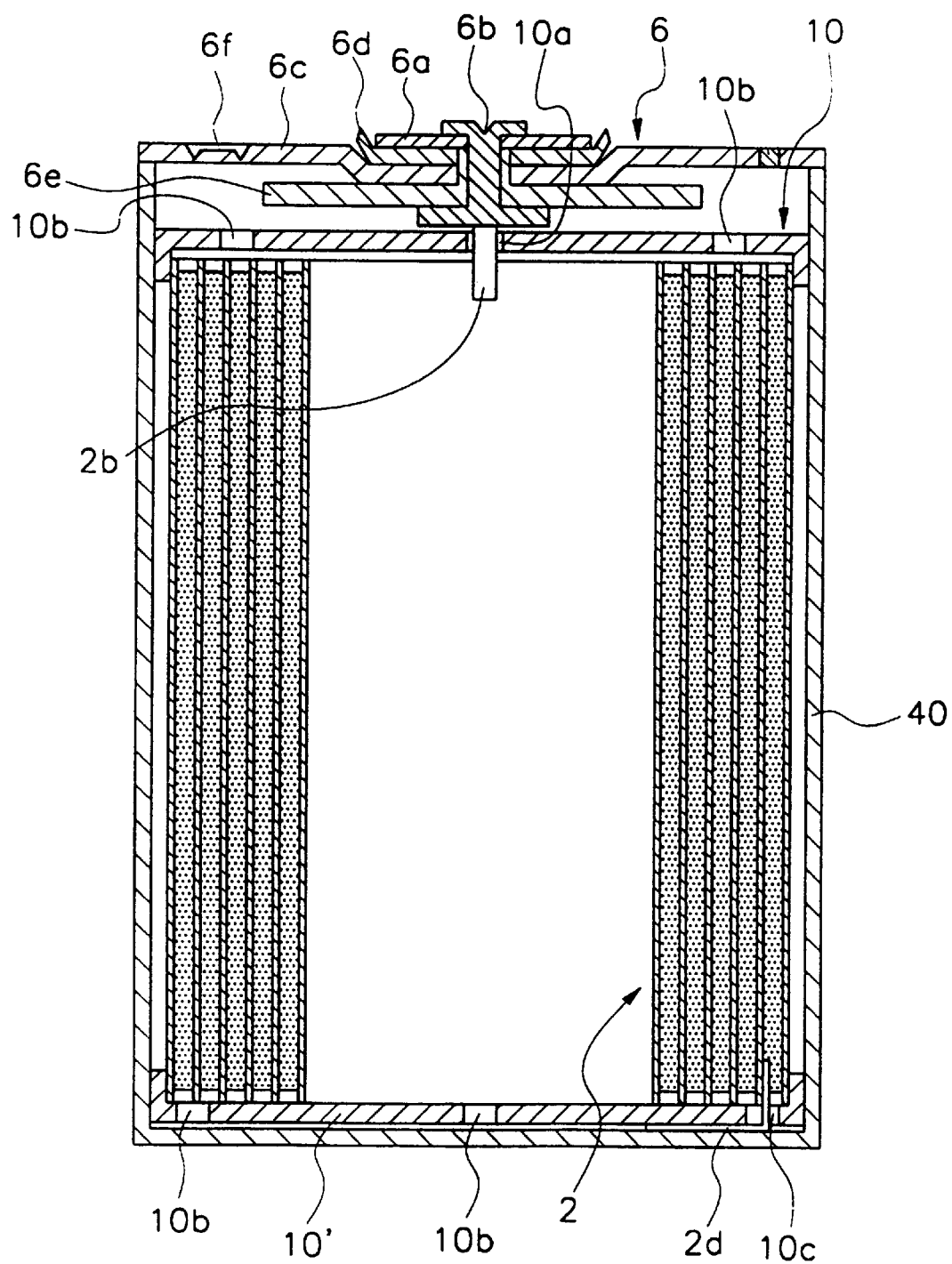
FIG. 4 is an exploded perspective view of a secondary battery according to a third preferred embodiment of the present invention.
Figure 5:
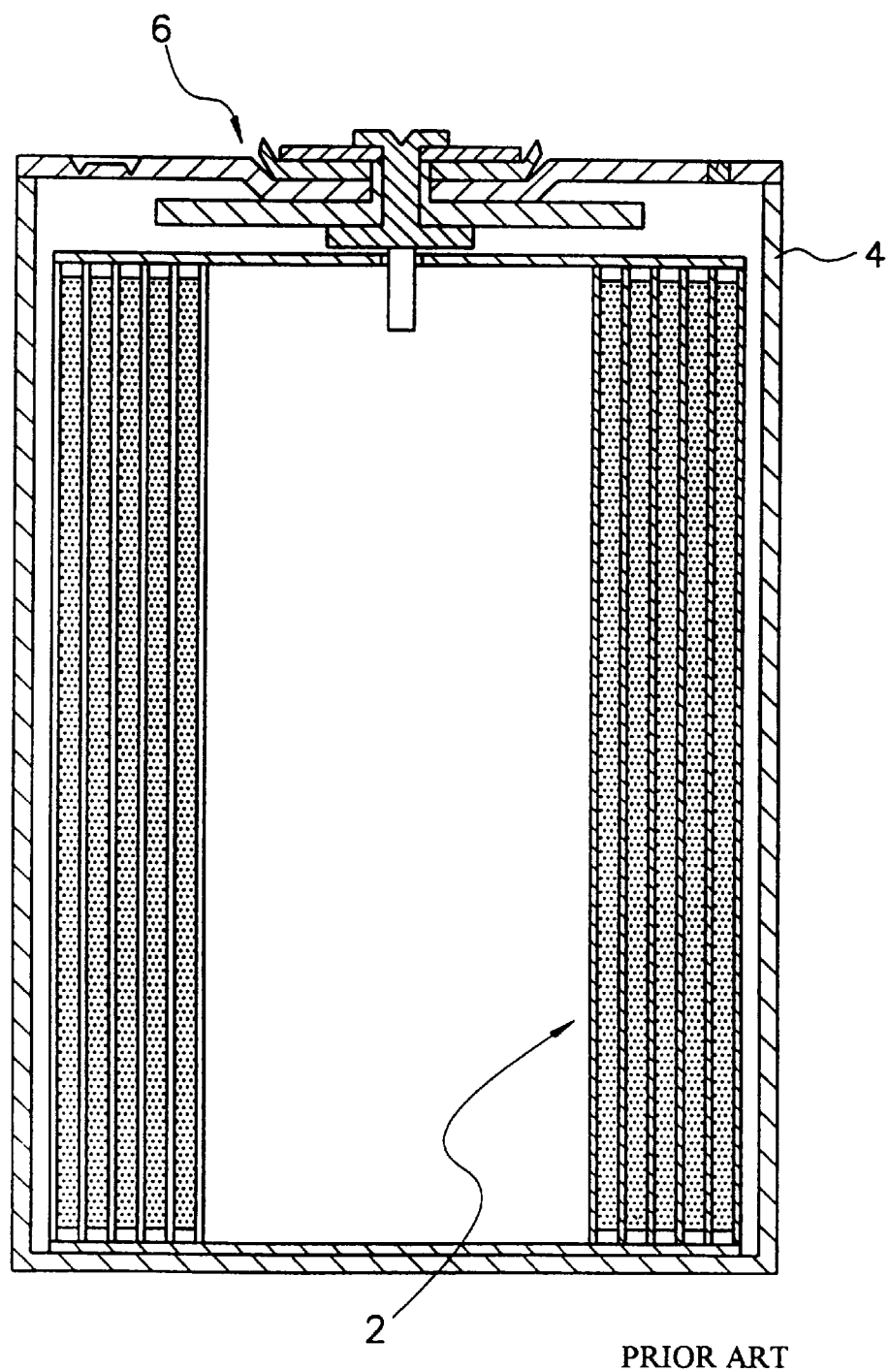
FIG. 5 is a sectional view illustrating a conventional prism-type secondary battery.

FIG. 4 shows a prism-type secondary battery according to a third preferred embodiment of the present invention.

A rolled electrode assembly 2 comprises positive and negative electrodes and separators disposed between the positive and negative electrodes. The outermost turn of the rolled electrode assembly 2 is fixed by a tape (not shown).

An electrode assembly fixing member is provided to prevent the rolled electrode assembly from being deformed by expansion and contraction of the electrode assembly or when outer impact is applied to the electrode assembly.

Describing more in detail, the electrode assembly fixing member comprises an upper cap 10 fitted onto an upper end of the rolled electrode assembly 2 and a lower cap 10' fitted onto a lower end of the rolled electrode assembly 2.

However, the electrode assembly fixing member is not limited to this structure. For example, only one of the upper and lower ends of the rolled electrode assembly 2 can be fitted into a cap. In addition, in this embodiment, to provide a more reliable fixing structure, the upper and lower caps 10 and 10' are fixed to the rolled electrode assembly 2 by a tape (not shown).

The upper and lower caps 10 and 10' are made of a material selected from the group consisting of polypropylene, polyethylene, polyvinylidene fluoride, stainless, teflon, Fe coated with nickel, nickel and aluminum which do not react with electrolyte and are not corroded by the lithium salt.

The rolled electrode assembly 2 tightly fitted into the caps 10 and 10' is inserted into a metal can 40 having a thickness of less than 0.4 mm. A cap assembly 6 is mounted on an upper end of the metal can 40 in which the rolled electrode assembly 2 is inserted. A negative tab 2d extending from the negative electrode of the rolled electrode assembly 2 is coupled to the metal can 40, and a positive tab 2b extending from the positive electrode of the electrode assembly is coupled to the cap assembly 6. The cap assembly 6 comprises positive and negative plates 6a and 6c, and an insulator 6d disposed between the positive and negative plates 6a and 6c, all of which are fixed together by a rivet 6b penetrating therethrough and coupled to the positive plate 6a via the positive tab 2b. The negative plate 6c is provided with safety grooves 6f and a gasket 6e is disposed between the rivet 6b negative plate 6c

The can 40 may be made of a thermoplastic resin polymer having a glassy transition temperature above 150° C. and a melting point above 200° C. The thermoplastic resin polymer has a temperature at least higher than short-down temperature of the separators by 40–50° C.

While this invention has been described in connection with what is presently considered to be the most practical and preferred embodiment, it is to be understood that the invention is not limited to the disclosed embodiments. For example, a shape of a cap fitted onto an electrode assembly can be varied according to a shape of the electrode assembly. Therefore, the present invention is intended to cover various modifications and equivalent arrangements included within the spirit and scope of the appended claims.

What is claimed is:

1. A battery comprising:

a case;

a rolled electrode assembly disposed within the case;

an electrode assembly fixing member receiving a portion of the rolled electrode assembly; and wherein the electrode assembly fixing member comprises a cap close-tightly fitted onto at least one of upper and lower ends of the rolled electrode assembly.

2. The battery of claim 1 wherein the electrode assembly fixing member further comprises a gripper holding the rolled electrode assembly.

3. The battery of claim 1 wherein the outermost turn of the rolled electrode assembly is fixed by a tape.

4. The battery of claim 1 wherein when the upper and lower ends of the rolled electrode assembly is fitted into the caps, the caps being connected to the rolled electrode assembly by a tape.

5. The battery of claim 1 wherein the cap has a plurality of holes.

6. The battery of claim 1 wherein the electrode assembly fixing member is made of a material selected from the group consisting of polypropylene, polyethylene, polyvinylidene fluoride, stainless steel, teflon, Fe coated with nickel, nickel and aluminum.

7. The battery of claim 1 wherein the case comprises a thermoplastic resin pouch.

8. The battery of claim 1 wherein the case comprises a laminated aluminum-thermoplastic resin pouch.

9. The battery of claim 1 wherein the case comprises a metal plate having a thickness of less than 0.4 mm.

10. A battery comprising:

a case;

a rolled electrode assembly disposed within the case;

an electrode assembly fixing member receiving a portion of the rolled electrode assembly; and wherein the electrode assembly fixing member comprises a gripper holding the rolled electrode assembly, and the electrode assembly fixing member further comprises flat plates disposed on surfaces of the rolled electrode assembly, the gripper facing the flat plates toward the surfaces of the rolled electrode assembly so as to uniformly apply pressure over the surface of the entire rolled electrode assembly.

* * * * *